United States Patent [19]

Mitoya

[11] Patent Number: 4,916,788
[45] Date of Patent: Apr. 17, 1990

[54] METHOD OF MANUFACTURING BALL JOINT

[75] Inventor: Yasunobu Mitoya, Nagoya, Japan

[73] Assignee: Tokai TRW & Co., Ltd., Kasugai, Japan

[21] Appl. No.: 389,168

[22] Filed: Aug. 3, 1989

Related U.S. Application Data

[63] Continuation of Ser. No. 218,633, Jul. 13, 1988, abandoned.

[30] Foreign Application Priority Data

Aug. 10, 1987 [JP] Japan .................................. 62-198170

[51] Int. Cl.⁴ .............................................. B23P 11/02
[52] U.S. Cl. ................................ 29/898.044; 29/527.7; 29/441.1; 403/122; 403/265
[58] Field of Search ............. 29/149.5 B, 527.7, 441.1; 403/122, 265; 164/476

[56] References Cited

U.S. PATENT DOCUMENTS

| | | | |
|---|---|---|---|
| 3,068,552 | 12/1962 | Williams et al. | 29/149.5 B |
| 3,197,842 | 8/1965 | Parker | 29/149.5 B |
| 3,220,093 | 11/1965 | White | 29/149.5 B |
| 3,570,090 | 3/1971 | Teramachi | 29/149.5 B |
| 3,594,026 | 7/1971 | Schmid | 29/149.5 B |
| 3,650,004 | 3/1972 | Bergstrom | 29/149.5 B |
| 3,986,250 | 10/1976 | Belsdorf | 29/149.5 B X |
| 4,691,422 | 9/1987 | Tilgner et al. | 403/122 X |

Primary Examiner—Mark Rosenbaum
Assistant Examiner—Frances Chin
Attorney, Agent, or Firm—Ladas & Parry

[57] ABSTRACT

A method of manufacturing a ball joint serves to reduce the cost for producing the joint. In the method, while a ball portion of a ball stud of the ball joint is being placed in a mold, a socket is cast-molded in such a manner that the socket will form an integral structure surrounding the ball portion. Thereafter, force is applied to the outer wall of the socket by means of a plurality of mill rolls in such a manner that the force causes deformation of the socket so as to allow the ball portion of the ball stud to be slidably rotated relative to the socket.

1 Claim, 3 Drawing Sheets

METHOD OF MANUFACTURING BALL JOINT

This is a continuation of copending application(s) Ser. No. 07/218,633 filed on July 13, 1988 now abandoned.

BACKGROUND OF THE INVENTION

1. Field of the Invention

The present invention relates to a method of manufacturing a ball joint and, more particularly, to a method of manufacturing a ball joint used in, for instance, a vehicle.

2. Description of the Prior Art

A conventional and typical ball joint which makes two component parts of a vehicle to be swingably joined is illustrated in FIG. 4. A ball joint 100 of this type comprises a socket 102 having a mounting portion 101 at which the socket 102 is fixed to a first component part of the vehicle associated (not shown), a bearing 106 fitted in a recess 108 of the socket 102 and formed with a recess 105 having a configuration complementary with an outer configuration of a ball portion 104 of a ball stud 103 to support the ball portion 104, and a plug 107 retaining the ball portion 104 within the socket 102 via the bearing 106. When the ball portion 104 of the ball stud 103 is rotated while being slided within the recess 105 of the bearing 106, the ball stud 103 which is connected to a second component part (not shown) of the vehicle is allowed to swing relative to the socket 102 in desired directions such as the direction A.

In order to manufacture and assemble such a ball joint 100, a fit-in body is prepared by fitting a ball portion 104 of a ball stud 103 into a recess 105 formed in a flexible and integral bearing 106 with a high level of precision, or an assembled body is prepared by assembling a bearing 106 consisting of at least two components, which together define a recess 105 formed and machined with a high level of precision, around a ball stud 103. Thereafter, the thus prepared fit-in body or assembled body is fit in a recess 108 of a socket 102. Lastly, a plug 107 is fitted in a groove which has previously been formed in the inner peripheral wall of the opening portion of the recess 108 of the socket 102, and the plug 107 is then caulked so as to prevent the fit-in or assembled body from being disengaged from the socket 102.

However, as would be clearly noted from the description given above, the ball joint 100 must have its members, such as the bearing 106, to be formed and machined with high levels of precision. This, together with the relatively large number of component parts required, causes an increase in the number of manufacturing processes required and makes production costs relatively high.

FIG. 5 illustrates another conventional ball joint 115. In the manufacture of the ball joint 115, instead of using the plug 107 to prevent disengagement and loose fit of the bearing 106 and the ball portion 104, the opening edge portion 111 of a socket 110 is caulked so that the ball portion 104 of the ball stud 103 is slidably supported within a recess 114 defined by assembled bearing components 113 and 112 and is retained in place through the flexible bearing portion 112.

However, with the method of manufacturing of the ball joint 115, it is essential to use a bearing member. Because the bearing components 112 and 113 should be formed with a high level of precision and also because relatively large number of components or parts and manufacturing processes are required, production costs become relatively high.

SUMMARY OF THE INVENTION

The present invention has been accomplished in view of the above-described drawbacks of the prior arts. An object of the present invention is to provide a method of manufacturing a ball joint, which is capable of easily and positively manufacturing a ball joint which has a minimum number of component parts and is relatively inexpensive.

To this end, according to the present invention, there is provided a method of manufacturing a ball joint comprising the steps of: while a ball portion of a ball stud of the ball joint is being placed in a mold, casting a socket in such a manner that the socket will form an integral structure surrounding the ball portion; and thereafter applying force to an outer wall of the socket by means of a plurality of mill rolls in such a manner that the force causes deformation of the socket so as to allow the ball portion of the ball stud to be slidably rotated relative to the socket.

Therefore, the method of manufacturing a ball joint in accordance with the present invention is capable of easily and positively manufacturing a ball joint, at relatively reduced cost, in which no bearing component need to be used.

In a method of manufacturing a ball joint in accordance with a preferred embodiment of the present invention, a socket of the ball joint is made from a metal having a melting point lower than that of the material forming a ball portion of a ball stud of the ball joint. the term "metal" used herein refers to either a single-metal material which is composed of one metallic element or an alloy which is composed of two or more metallic elements. A small amount of one or more non-metallic elements may be contained in some cases. If the ball portion of the ball stud is formed of such steel as SCM 435, the metal forming the socket can be, for instance, silumin (alpax) ADC 12.

Further, in the ball joint manufacturing method according to a preferred embodiment of the present invention, a film or layer of lubricating oil is formed between the peripheral wall of a recess of the socket and the outer peripheral surface of the ball portion of the ball stud.

DESCRIPTION OF THE PREFERRED EMBODIMENT

The ball joint manufacturing method in accordance with the preferred embodiment of the present invention will now be described with reference to FIGS. 1 to 3.

Figure 2:
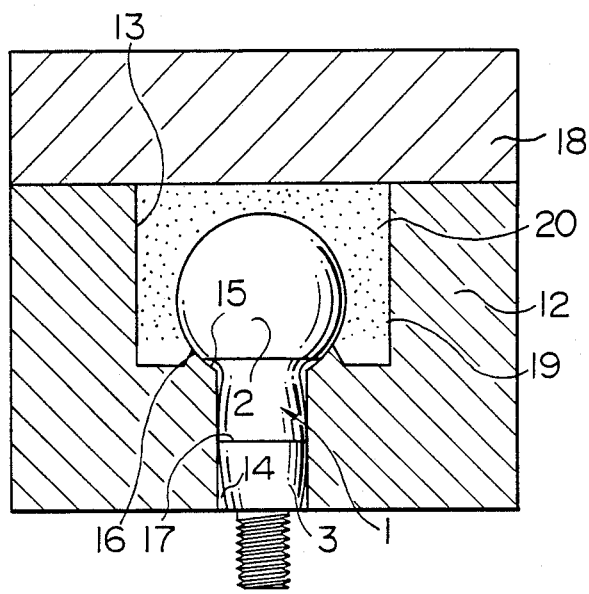
FIG. 2 is a sectional view illustrating a step of the method according to the preferred embodiment of the present invention, in which the socket (body thereof) is being cast-molded.
Figure 3:
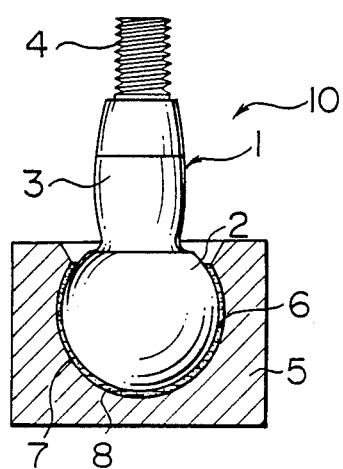
FIG. 3 is a sectional view illustrating a ball joint manufactured by the method according to the preferred embodiment of the present invention illustrated in FIGS. 1 and 2.
Figure 4:
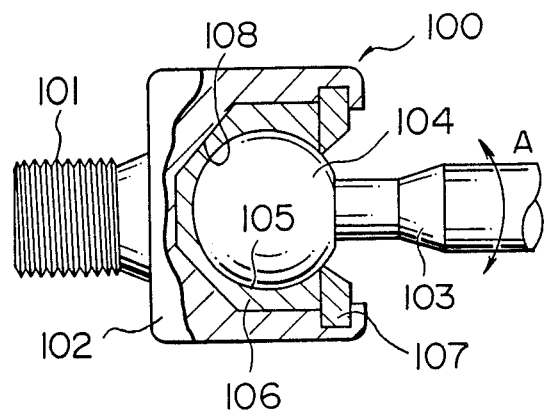
FIGS. 4 and 5 are sectional views each illustrating a ball joint manufactured by a conventional method.
Figure 5:
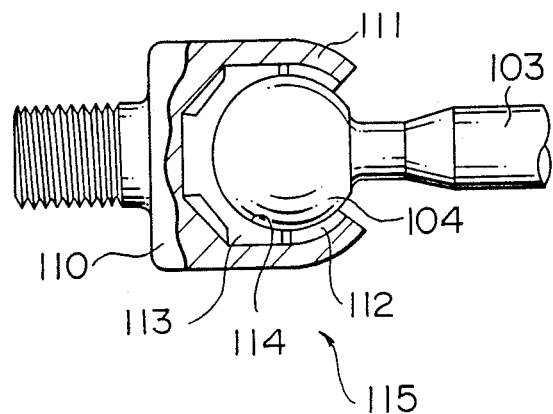

FIG. 3 shows a ball joint 10 manufactured by the method of the present invention. In FIGS. 1 to 3, reference numeral 1 denotes a ball stud which is made of steel and which comprises a ball portion 2 and a stud portion 3. The stud portion 3 has, at one end thereof, a threaded portion 4 which can be threaded into a first component part of the vehicle associated (neither of which is shown). Reference numeral 5 denotes a socket 5 formed with a recess 6 having an inner diameter substantially equal to the outer diameter of a spherical ball portion 2 of the ball stud 1 or having a configuration complementary with that of the ball portion 2. The socket 5 is an integral structure formed of a highly wear-resistant metal having a melting point lower than that of steel such as SCM 435. The recess 6 which has an inner diameter substantially equal to the outer diameter of the ball portion 2 of the socket 5 supports the ball portion 2 in such a manner as to allow the sliding and rolling of the ball portion 2 therein. The socket 5 may be formed in such a manner as to have an outer configuration suitable for being mounted on a second component part (not shown) of the vehicle.

As shown in FIG. 3, a film or layer 8 of lubricating oil is formed in a very narrow gap 7 between the wall of the recess 6 of the socket 5 and the ball portion 2 of the ball stud 1, the gap 7 being shown in FIG. 3 as it is rather exaggerated for the sake of clarification (actually, since the inner diameter of the recess 6 and the outer diameter of the ball portion 2 are substantially equal, as stated before, the gap 7 is very narrow but has a size enough to form the oil film 8 substantially over the entire periphery of the ball 2).

The oil film 8 may not be separately provided if the socket 5 is formed of a material capable of imparting lubricating properties, or if the material forming the socket 5 is impregnated with lubricating oil.

With the ball joint 10 having the above-described construction, the ball portion 2 of the ball stud 1 is supported by the recess 6 of the socket 5, with the film 8 alone being therebetween, in such a manner that the ball portion 2 is able to be rotated, while being slided, relative to the socket 5. By virtue of this arrangement, neither a plug nor a bearing member is necessary, thus requiring a reduced number of components. This makes it possible for the ball joint 10 to be manufactured and assembled by simplified processes and, hence, to achieve reduction in production costs.

The ball joint 10 is manufactured by the method of the present invention and, preferably, in the following manner which will be described by way of example.

First, as shown in FIG. 2, a lower mold part 12 of a mold device has a recess 13 for forming a socket, and a penetrating hole 14 is formed through the bottom of the recess 13. A stud portion 3 of a ball stud 1, whose spherical surface has previously been coated with a parting agent or mold release agent, is inserted downward from above through the penetrating hole 14. By this operation, the base portion 16 of a ball portion 2 is brought into close contact with a tapered hole portion 15 formed around the upper edge of the penetrating hole 14 and, simultaneously, the intermediate enlarged portion 17 of the stud portion 3 is substantially brought into close contact with the mating surface of the penetrating hole 14. Subsequently, an upper mold part 18 is placed on the lower mold part 12 so that the recess 13 of the lower mold part 12 is substantially enclosed to form an enclosed chamber 19. A certain mount of molten silumin (alpax) having a melting point lower than that of steel is poured and charged under a normal or increased pressure into the substantially enclosed chamber 19 through an inlet (not shown) formed through the upper mold part 18. When the silumin (alpax) filling the chamber 19 has been cooled and solidified, a semi-finished body 20 of a socket 5 is formed as an integral structure. Since the semi-finished socket body 20 has slightly shrunk during the cooling, the body 20 is substantially locked or fixed onto the ball portion 2 of the ball stud 1 when the mold is opened and the body 20 is taken out of the mold parts 18 and 12.

Figure 1:
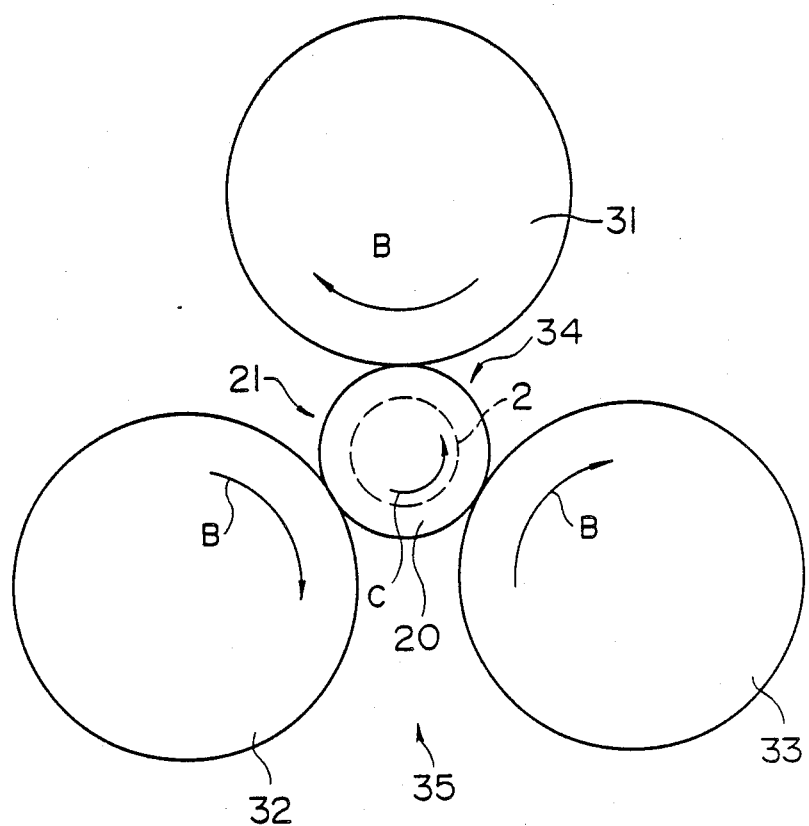
FIG. 1 is an explanatory view illustrating a step of a method of manufacturing a ball joint in accordance with a preferred embodiment of the present invention, in which, after a body of a socket has been cast or cast-molded, certain deformation force is being applied to the cast-molded and hence semi-finished body of the socket by means of rolls of a roll mill so as to allow movement of the semi-finished socket body relative to a ball portion of a ball stud.

Subsequently, as shown in FIG. 1, a unit 21 formed by the semi-finished socket body 20 and the ball study 1, which has been taken out of the mold, is disposed in contact with and held between three mill rolls 31, 32 and 33. More specifically, the unit 21 is held by these rolls 31, 32 and 33 at or in the vicinity of the portion of the unit 21 where the diameter of the ball portion 2 of the ball stud 1 in a cross-section parallel to a plane of FIG. 1 (normal to the axis of the ball stud 1) is at its maximum. While the unit 21 is being held in this way, the rolls 31, 32 and 33 are rotated in the same direction B as they apply compression force directed to the center of the ball portion 2 to the outer wall of the semi-finished socket body 20, thereby deformation force is applied to the semi-finished socket body 20, and the body 20 is thus subjected to a low or weak level of rolling. During this operation, the unit 21 also rotates, but it rotates in the direction C. Consequently, the deformation force applied to the semi-finished socket body 20 causes the spherical recess 6 of the body 20 to become separated from the spherical outer peripheral surface of the ball portion 2. Thus, the recess 6 can therefore be separated from the ball portion 2 easily and positively and, when this has been done, the semi-finished socket body 20 is completed as the socket 5 which is slidable and rotatable relative to the ball portion 2. By this separation, a small gap 7 is formed between the peripheral surface of the recess 6 of the socket 5 and the outer peripheral surface of the ball portion 2 of the ball stud 1. The lubricant oil is poured into an annular or spherical recess 9 defined by the socket 5 and the stud 1 and, under this condition, a further rolling is effected. Since newly formed part of the gap 7 will be in a vacuum or negative pressure, the poured lubricant oil easily fills the gap 7 to form a lubricant-oil film 8. The formation of the oil film 8 may be performed either during manufacture or before use, i.e., before the mounting of the ball joint 10 to the vehicle or the like.

I claim:

1. A method of manufacturing a ball joint, said method comprising the steps of:

placing a ball portion of a ball stud of said joint in a mold;

casting a socket in said mold in the form of an integral structure surrounding said ball portion;

applying a rolling force to an outer wall of said cast socket by means of a plurality of mill rolls in such a manner that the rolling force causes deformation of said socket so as to allow said ball portion of said ball stud to be slidable rotated relative to said socket; and supplying a lubricating oil into an annular recess defined by said socket and said ball stud before completing the application of the rolling force so as to allow the lubricating oil to be forced into a gap formed, under a negative pressure, between said socket and said ball portion during the application of the rolling force due to a difference in pressures at a side of the applied lubricating oil exposed to the gap under the negative pressure and the other side of the applied oil exposed to an ambient pressure.

* * * * *